Jan. 27, 1953 J. E. McDONALD 2,626,766
ROTOR ARRANGEMENT FOR SINGLE-ROTOR HELICOPTERS
Filed Sept. 9, 1947 2 SHEETS—SHEET 1

INVENTOR
JOHN E. McDONALD
BY
ATTORNEYS

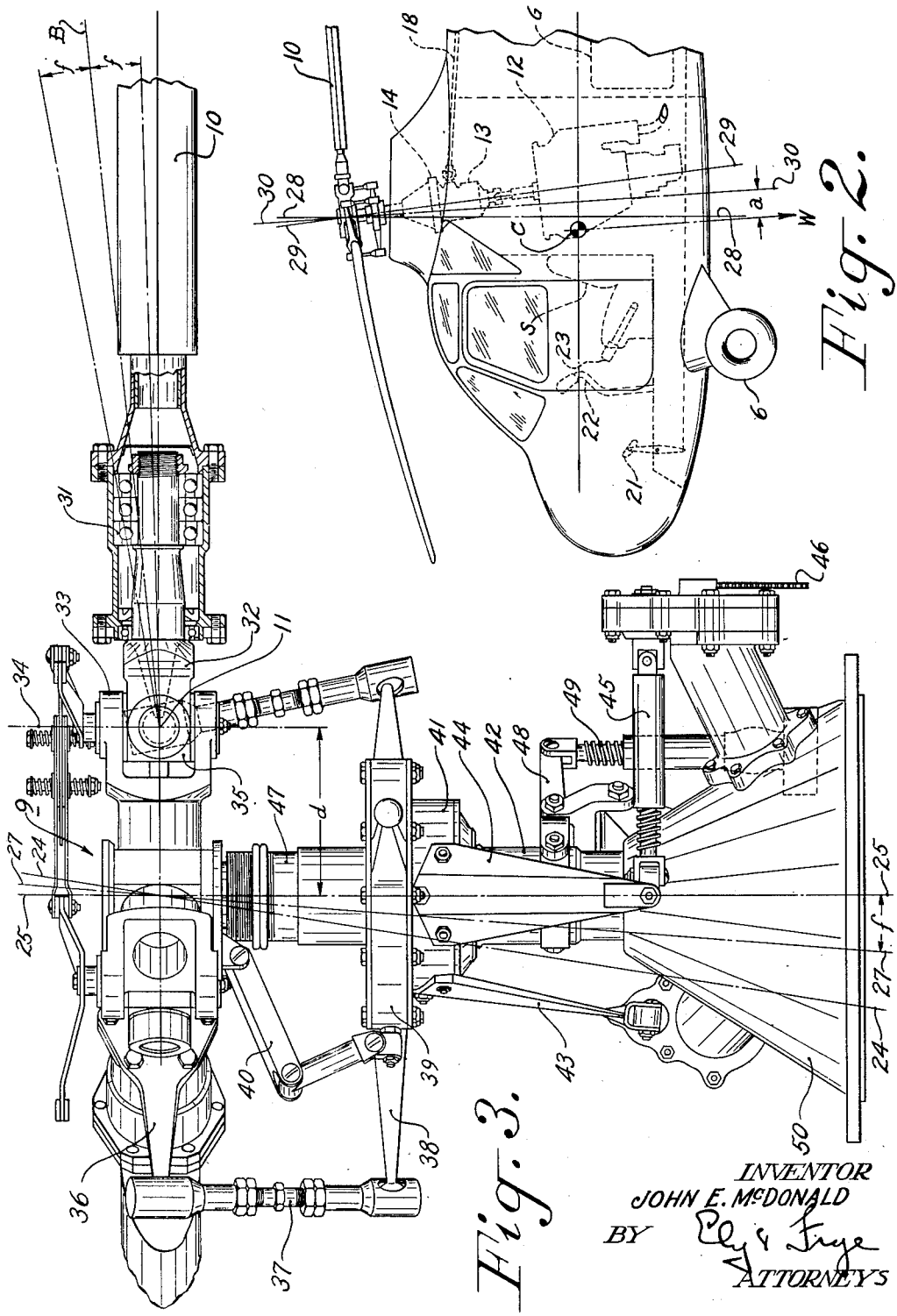

Patented Jan. 27, 1953

2,626,766

UNITED STATES PATENT OFFICE 2,626,766

ROTOR ARRANGEMENT FOR SINGLE-ROTOR HELICOPTERS

John E. McDonald, Newton, Mass., assignor to The Firestone Tire & Rubber Company, Akron, Ohio, a corporation of Ohio Application September 9, 1947, Serial No. 773,021

4 Claims. (Cl. 244—17.11)

This invention relates to improvements in the stability and control of rotative wing aircraft and is particularly concerned with aircraft having a primary sustaining and propulsion rotor or rotors mounted in a single plane.

In aircraft having rotative wings it has been customary normally to provide rotors having blades which are attached to the rotor hub by flapping pivots which permit the blade to move to a position of equilibrium under the influence of centrifugal and lift forces. In order to reduce the centrifugal moments applied to hub structure, the location of the flapping pivot of each rotor blade has usually been kept as close to the axis of rotation as could be accomplished by practical blade attachment structure. The present invention contemplates locating the flapping pivot axis of each blade at a point which is offset from the rotational axis a relatively greater distance than has heretofore been the practice. Combined with this offset of flapping axis, the present invention provides an average center of gravity for the aircraft which is offset forwardly from the plane containing the downward extension of the axis of rotation of the rotor hub. This longitudinal offset of the center of gravity position introduces a longitudinal or pitching moment. Instead of the center of gravity seeking a position directly under the center of lift during hovering or vertical flight after the manner of a pendulum, the combination of offset center of gravity and offset flapping pivots causes a counter longitudinal moment to be developed by the centrifugal blade forces at the hub. The moment produced by the centrifugal force of the blades is due to the fact that the axis of rotation of the hub during this condition of flight makes a small angle with respect to the true vertical and with respect to the blade tip path plane, thus allowing the centrifugal force of the blades to apply a moment to the axle due to the offset of the flapping axis.

In one suitable arrangement of parts the center of gravity is forward of the vertical reference line and the axis of rotation is close to the vertical reference line. In hovering or vertical flight the nose-down moment produced by the offset of the center of gravity will cause a slight nose-down attitude to an extent such that the rotor axis makes a small angle with respect to the true vertical thereby producing a centrifugal moment through the offset flapping pivots to balance the weight moment.

In another desirable arrangement the center of gravity may be located closer to the vertical reference axis and the rotor hub axis of rotation may be angularly displaced to fall behind the vertical reference. The action of the centrifugal force of the blades during each revolution working through the offset flapping axis will thus introduce a moment to cause the nose to raise slightly in hovering flight until the center of gravity is displaced forwardly with respect to the true vertical through the center of the rotor hub to produce a counterbalancing moment.

In either of the above arrangements there are developed counteracting moments in the longitudinal plane producing a powerful stabilizing action which remains positive under all normal conditions of flight. In some instances the second arrangement with the angular displacement of the rotor axis provides a particularly desirable construction because the relative location of the fixed weights, such as the engine accessories and occupants' seats, may be advantageously located with respect to other items without undue complication of the structure. In addition, the introduction of a nose-up attitude during hovering flight reduces the amount of nose-down angle produced during high speed forward flight. Reduction of this nose-down attitude at high speed results in a more comfortable position for the occupants and also gives a more efficient flight attitude for the craft with reduced aerodynamic drag.

An important object of the invention is to provide an increase in the permissible center of gravity excursion in the longitudinal direction for single rotor aircraft. In machines of this general type it has heretofore been necessary to maintain a fairly restricted balance condition which varies only a slight amount for all loading conditions of the craft. This was due to the fact that the control range of the rotor was limited and any variation of the center of gravity position from the normal position had to be corrected by relocation of the neutral stick position by an amount sufficient to cause the rotor lift vector to pass through or close to the center of gravity position. With the structure and arrangement of the present invention a much greater center of gravity variation is permissible since the amount of stick position change for a given movement of the center of gravity is greatly reduced over that required in previous configurations. In the proportions disclosed in the present application the amount of stick travel required to take care of a given center of gravity change is only about half the normal amount required in orthodox constructions. However, an excursion of the center of gravity of more than twice the usual amount may be permitted in aircraft utilizing the present invention because, as will be hereinafter brought out, the amount of control stick movement for control purposes may be reduced with the present invention so that a greater proportion of the control stick range in the longitudinal plane may be directed toward correction of center of gravity location.

A further object of the invention is to provide an improved control response for aircraft of the type disclosed. One of the problems of aircraft of this nature was that at high forward speeds, it is necessary to move the stick forwardly to an increased extent as the speed increased in order to provide cyclic pitch variation to counteract the nosing-up tendency produced by forward flight. In some aircraft designs the high speed may be limited by the amount of control stick travel available, since there may be insufficient control to counteract this nosing-up moment, particularly when full power is applied. With the arrangement of the present invention the control response for a given stick movement is amplified due to the centrifugal moment developed by the blades when even a small control pitch change is made. Thus for a given movement of cyclic pitch change a greater control response is developed resulting in ample control being available for all conditions of flight.

In order to maintain a simple structure and reduce the complexity of the motions of the rotor blades with respect to the hub, the present invention has as a specific object the provision of a drag pivot closely associated with the flapping pivot structure. This construction which results in substantially intersecting flapping and drag pivots provides for smoother operation of the rotor. In this respect it is preferred to locate the blade pitch mounting outboard the drag and flapping pivots. By this construction motions of the blades as they move with respect to the hub to produce the centrifugal moments previously mentioned are kept more uniform and the secondary motions and vibrations may thus be kept a minimum.

How these and other objects and advantages incidental to the invention are attained will be clear from the description of the drawings in which—

Figure 2 is a side view illustrating an alternative mounting for the rotor.

Figure 3 is an enlarged side elevational view of a rotor hub construction suitable for use in the present invention.

Figure 1:
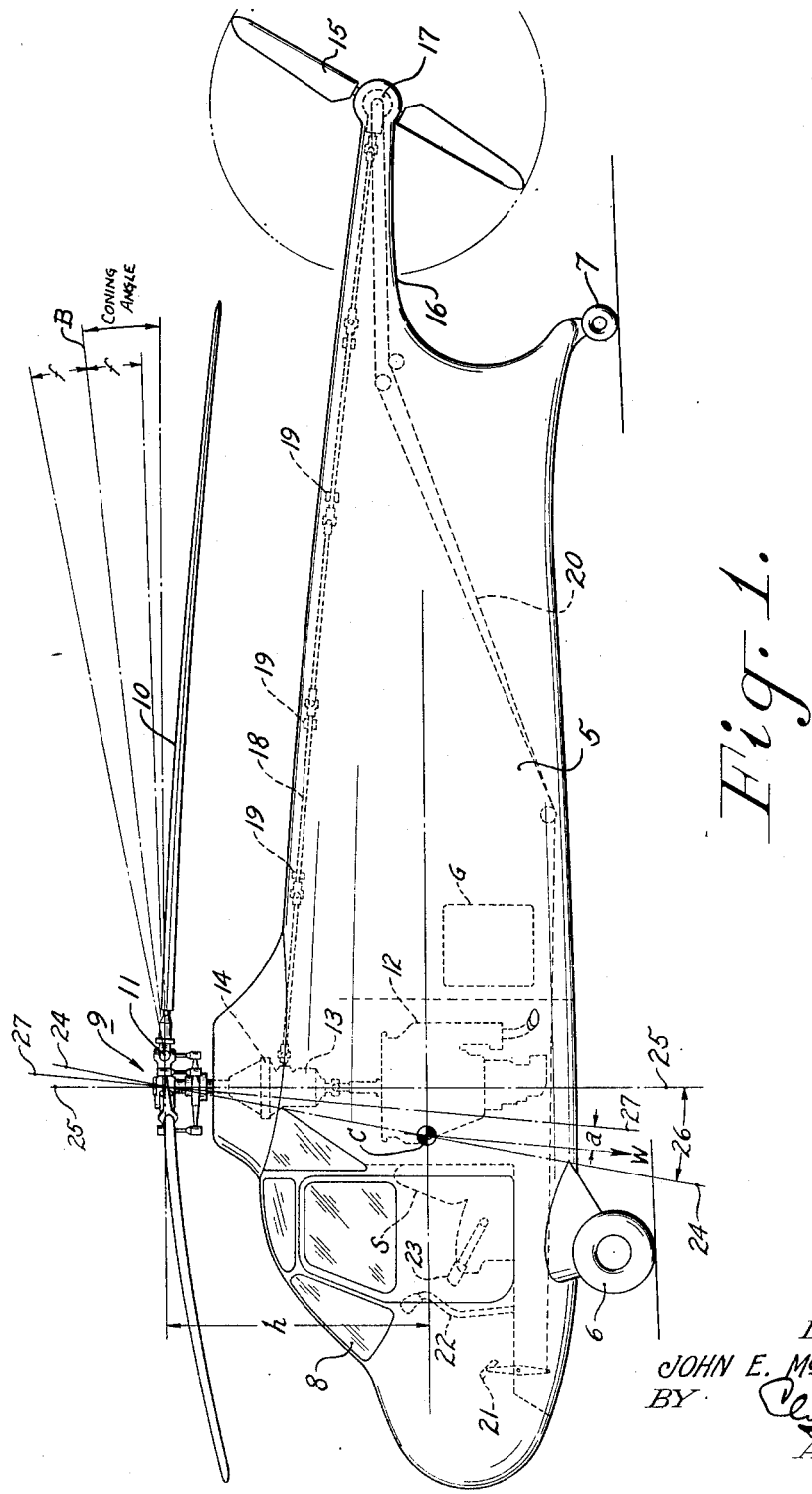
Figure 1 is a side elevational view of an aircraft incorporating the features of the present invention.

Referring to Figure 1, it will be seen that the aircraft shown has a fuselage 5 which is supported while on the ground by forward landing gear members 6 and rear wheel 7. An occupants' compartment 8 is provided at the forward end of the craft. A main sustaining rotor generally indicated by numeral 9 provides for the sustention of the aircraft while in flight. The rotor 9 includes rotor blades 10, each of which is attached to the rotor hub by a flapping pivot 11. An occupants' seat S is shown suitable for two persons and a gas tank G is located behind the engine compartment.

The rotor 9 is driven during powered operation by an engine 12. A transmission unit is provided for delivering the engine power to the main rotor, there being a clutch unit 13 and a reduction gear unit 14. The gear unit provides for speed reduction to the rotor R. P. M. required for efficient operation.

A tail rotor having blades 15 is located at the rear end of the fuselage 5 on an extension 16. This location of the tail rotor provides adequate clearance between the tail rotor and the main rotor. The tail rotor is mounted with its center a sufficient distance above the ground to provide clearance for the blades 15 under all conditions of operation. The center of rotation of the tail rotor, which is also the thrust axis, is indicated by numeral 17.

Drive shaft 18 which is supported by bearings 19 transmits the power from the transmission gear unit 14 to the tail rotor. The power take-off for driving the shaft 18 is preferably located above the clutch unit 13, which also includes an overrunning clutch to allow automatic disconnection of the rotor from the engine in the event of engine failure. Under such conditions the rotor continues to operate under the influence of the relative airflow in an autorotational condition. During autorotational operation of the main rotor, the tail rotor is driven by the main rotor and thus provides for directional control of the aircraft even in the absence of engine power. While under autorotational operation, the main rotor, being driven by the relative airflow, does not produce a reaction torque on the fuselage. As a result under this condition of operation practically no thrust is required from the tail rotor blades 15 except for directional control purposes. The thrust of the tail rotor is controlled by means of changing the pitch of the tail rotor blades 15 through the medium of control cables 20 which are connected to the pilot's rudder pedals 21.

The longitudinal and lateral control of the aircraft is accomplished by means of differential pitch change of the rotor blades. The blade pitch control mechanism is connected to the pilot's control 22, which may be of the usual type for aircraft. The stick 22 is moved in the fore and aft direction for longitudinal control and sideways for lateral control. An additional control member 23 is provided to actuate the blade pitch for simultaneous pitch change to increase or decrease the lift effect of the blades. This control also serves to reduce the pitch of the blades to autorotational range for operation without power.

In Figure 1 the center of gravity C of the craft is shown on a line 24—24 and lies considerably ahead of the line 25—25, which represents the vertical reference line through the rotor hub and also the axis of rotation. In most rotative wing aircraft having blades pivotally connected to the rotor hub, in order to fly under hovering conditions it would be necessary to operate the rotor with its plane of rotation approximately perpendicular to the line 24—24 and thus develop a thrust directly through the center of gravity C. As a result, for the location of center of gravity indicated in Figure 1, the craft would fly with its nose down at an angle indicated by the numeral 26. This is due to the fact that in most rotative wing aircraft having flapping pivots for attachment of the blades, the location of the pivot is kept close to the center of rotation of the hub. This construction is used with the object of providing greater smoothness of operation for the rotor and the rotor controls and of preventing centrifugal moments developed by the blades from being applied to the hub structure and thus transmitted to the craft. With the present construction such centrifugal moments are utilized for useful purposes in improving the control of the aircraft and maintaining a more constant flight attitude while at the same time permitting an increased variation in center of gravity position. The hub and control configurations disclosed in the present application have been found to provide a smoothly operating rotor system with minimum vibration transmitted to the fuselage and control systems.

With the construction illustrated, the flight attitude of the aircraft with the center of gravity in the position indicated will be more nearly the normal horizontal position. Assume the attitude of the aircraft is such that the line indicated as 27—27 will be vertical in hovering attitude. The weight W of the aircraft will, therefore, act parallel to line 27—27 at a distance $a$. In this attitude the weight will produce a nose-heavy moment equal to $W \times a$. In order to stabilize this attitude the centrifugal moments applied by the blades to the hub should equal the moment $W \times a$.

For purposes of illustration it will be assumed that the line between the center of the rotor hub and the center of gravity, that is line 24—24, is eight degrees from the axis of the rotor hub 25—25. The angle between the vertical 27—27 and the axis of rotation 25—25 is taken as a first trial to be 4¼ degrees. The distance of the center of gravity below the plane of the blades is indicated as $h$, which for the present example is 65 inches. The offset of the flapping pivot 11 is shown as $d$ in Figure 3, and will be taken equal to 7 inches. The operational centrifugal force of each blade is readily determined knowing the weight and location of the blade center of gravity and the R. P. M. of the rotor.

For the present example, the centrifugal force of each blade is $$C_F = (.000341) w r N^2$$

$w$ = weight of blade = 40 lbs.
$r$ = Distance from center of rotation to C. G. of blade = 7.2 ft.
$N$ = 290 R. P. M.
$C_F = (.000341)(40)(7.2)(290)^2 = 9750$ lbs.

The value of offset $a$ will be approximately—

$$h \tan(8° - 4\tfrac{1}{4}°) = h \tan 3\tfrac{3}{4}°$$
$$= (65)(.0654) = 4.25 \text{ inches}$$

The effective weight will be the gross weight less the weight of the blades which are hinged = 2000 − 120 = 1880 lbs.

Weight moment about center of rotor hub =

$$M_w = Wa = (1880)(4.25) = 7990 \text{ lbs. in.}$$

For a three blade rotor it can be shown that the centrifugal moment developed in the longitudinal plane is one and one-half times the maximum moment for a single blade.

Centrifugal blade moment $M_c =$
$(1.5)(7.0) C_F \sin 4\tfrac{1}{4}° =$
$(1.5)(7.0)(9750)(.0741) = 7600$ lbs. in.

This first selection is sufficiently close since only a few minutes change in the angle of the selected vertical line would be required to make $M_w = M_c$. Thus it will be seen that any displacement from the balanced position will introduce not only a correcting pendular moment due to the weight displacement but also an additional powerful centrifugal blade moment, both operating to return the ship to neutral position.

In Figure 2 the vertical reference line 28—28 passes close to or through the center of gravity although it will be evident that for variation in load the center of gravity may shift to a position ahead of or behind that shown. The axis of rotation of 29—29 is tilted by attaching the rotor hub to the aircraft at an angle so that the downward extension of the axis 29—29 lies behind the vertical reference line 28—28. During hovering flight the aircraft will tend to assume an attitude in which the true vertical lies at a position between the center of gravity and the axis of rotation 29—29. Flight in this position introduces a nose-up moment produced by the centrifugal force of the blades causing the ship to fly in a slightly nose-up attitude since the vertical reference line 28—28 now lies ahead of the true vertical 30—30. As in the previous example, the weight moment acting at a distance $a$ from the true vertical produces the counter moment balancing the centrifugal blade moment acting through the flapping pivot offset.

This nose-up attitude of the aircraft may amount to as much as two or three degrees instead of the several degrees nose-down attitude discussed in the example illustrated in Figure 1. At high speed forward flight it is necessary that the inclination of the rotor be such that it produces sufficient forward thrust to overcome the drag of the aircraft. In some instances this inclination may amount to twenty degrees or more. By having a center of gravity and inclined axis arranged in the relative positions indicated in Figure 2, the attitude of the horizontal reference line during high speed forward flight may have several degrees less inclination than the arrangement with the center of gravity and axis of rotation located in the relationship illustrated in Figure 1. Thus one of the advantages of this inclined axis arrangement is that it provides for a more comfortable position of the occupant's seat and the floor during high speed flight. Another advantage is that this arrangement allows the location of the engine and accessory units to be placed slightly aft of the center of the rotor hub resulting in improved space conditions for location of items in the engine compartment and more advantageous location of the occupants' seats.

Figure 3 illustrates in greater detail the construction of the hub and control for the rotor system. The rotor blade 10 is attached to the rotor hub 9 by means of a pitch change mounting incorporating thrust bearings 31. The blade forks 32 are attached to the hub lugs 33 by means of a flapping pivot with its axis at 11 and a drag pivot having its axis at 34. A universal block 35 provides the interconnection for the pivot structure. It will be noticed that the flapping pivot moves with the blade when blade motion in the drag sense is occurring, this being the result of mounting the drag pivot directly in the rotor hub structure. The flapping pivot is indicated in Figure 3 at an offset distance $d$ from the axis of rotation 25—25. In the example illustrated the flapping pivot offset is approximately four per cent of the blade radius. This has been found to be a desirable amount of offset particularly in aircraft of intermediate size. A suitable range for the offset would be from about two and one-half per cent to five per cent of the blade radius.

The average coning position of the blades is indicated by line B in Figures 1 and 3. Since the resultant lift of the rotor is to be along the line 27—27 each blade must move through an angle $f$ above and below the average coning position B during each revolution. Thus a blade in the rear position will make an angle equal to angle $f$ below the average coning position while a blade in the forward position will make an angle equal to angle $f$ above the average coning position. At the flapping pivot the variation in the amount of lift parallel to the rotational axis will, therefore, be a reduction equal to the centrifugal force times the sine of angle $f$ in the rearward position and an increase of this amount in the forward position. In a three blade rotor this blade lift variation produces a constant moment at the hub center equal to one and a half times $d$ multiplied by the centrifugal force, multiplied by the sine of $f$. This value was used above in connection with the numerical example and was expressed as $M_C = (1.5)(d)(C_F) \sin f$.

The aircraft is controlled by changing the pitch of the blades in either a differential (cyclic) sense for controlling the attitude of the aircraft or a simultaneous (collective) sense for changing the lift effect. A control arm 36 attached to the blade is moved by means of a push rod 37 attached to arms 38 extending from the swash plate. This includes an outer rotatable member 39 which is caused to rotate in unison with the hub by means of scissors linkage 40. The outer swash member 39 is supported on a non-rotating inner support 41 with suitable bearings interposed between members 39 and 41. The member 41 is pivotally attached to a sleeve 42 to permit tilting movement in any direction. Tilting movement of the member 41 is controlled by means of arms 43 and 44 which are in turn controlled by screw-thread units 45 actuated by chains as illustrated at 46. One of the screw-thread units is connected for actuation by the control stick 22 in the longitudinal sense while the other is controlled through lateral movements of the control stick 22. In this fashion tilting of the swash member 39 to any plane required for control is accomplished.

The sleeve 42 is mounted on a non-rotating axle member 47 so that it may be raised or lowered by the beam 48 which in turn is actuated by another screw-thread device 49 connected to the simultaneous or collective control pitch lever 23. The rotational axle of the hub is supported by suitable bearings mounted inside the stationary axle 47 and the base 50.

With this hub construction the rotor blades may be caused to rotate in the proper path to provide the longitudinal moment introduced by centrifugal force through the offset $d$ of the flapping hinge. When the center of gravity of the aircraft is displaced from the axis of rotation the cyclic variation of pitch applied to the rotor blades by means of a slight displacement of the control stick 22 produces the powerful centrifugal moment applied through the offset $d$ which causes the improved stability and control action over constructions in which the center of gravity acts essentially as a pendulum with respect to the center of the hub.

It will be observed in Figure 1 that the occupants' seat S is located somewhat forwardly of the center of gravity C of the aircraft, while the gas tank G is located to the rear of the center of gravity. With this arrangement of disposable loads, when the aircraft is flying with only a pilot and with full gas, the center of gravity will move somewhat rearwardly. With two persons and partial gas the center of gravity will move forwardly. It is such variations in the location of the center of gravity which are readily handled by the construction of the present invention with a minimum change of control position and aircraft attitude during flight.

As was previously mentioned, a three blade rotor gives particularly good results when combined with the structure of the present invention since the longitudinal moments developed by the centrifugal effect of the blades is essentially constant throughout the cycle of rotation. This is due to the fact that regardless of the instantaneous position of the rotor blades the summation of the longitudinal moments from each of the blades remains constant. This is not true for a two blade rotor in which a strong longitudinal moment is produced when the blades are fore and aft, but a low longitudinal moment is produced when the blades are in transverse position. Thus with a two bladed rotor a fluctuating moment having a twice per revolution frequency of considerable magnitude will occur. A somewhat similar fluctuation having a four times per revolution frequency will occur with a four bladed rotor although the moment variation in this case is comparatively small.

While the rotor hub has been described as being fixed to the fuselage, this is intended to mean that the hub does not move for normal control purposes. A hub adjustment might be provided which is capable of transferring moments between the hub and the fuselage while still meeting the requirements of the hub fixation of the present invention.

From the foregoing description it will be seen that I have provided a construction which constantly balances one moment against another to give an improved stabilizing action for the aircraft as compared to the condition where in the stable position of the center of gravity no appreciable moment is developed. With this improved stability there results a faster return to neutral position after displacement with less tendency to hunt or oscillate.

This improved construction also produces better control response with a reduction in the required stick travel, the control response being more powerful and capable of taking care of increased center of gravity travel without an increase in stick travel and without the need for shiftable ballast. This system further eliminates the problems previously encountered in high-speed forward flight where insufficient control movement remained for satisfactory control purposes.

I claim:

1. An aircraft having a fuselage, a combination powered propelling and lifting rotor having its center of rotation in a transverse vertical plane slightly behind the center of gravity of the aircraft, said rotor having a rotatable hub part with structure extending therefrom for transmitting moments thereto, said rotor having at least three blades, a pitch pivot for each blade, a flapping pivot for each of said blades attached to the hub extension structure and offset from the axis of rotor rotation, control connections to each blade to provide cyclic pitch variation for flight control, said rotor having its axis of rotation fixed with respect to said fuselage in a position to give the axis of rotation an inclined angle to said transverse vertical plane so that the axis of rotation lies behind said plane, the forward offset of the center of gravity thereby producing a longitudinal nose-down moment about the hub center which is balanced by a nose-up moment produced by the combination of offset pivot axes, inclined rotational axis and cyclic blade control to produce a nose-up attitude with respect to said plane during hovering flight.

2. An aircraft having a fuselage, a rotor which both lifts the aircraft and propels it horizontally, power means connected to said rotor for driving purposes, axis structure fixed to the fuselage and supporting said rotor, said rotor including a hub and a plurality of blades, each blade being mounted with respect to said hub for pitch change motions about the longitudinal axis of the blade and for flapping motion about a horizontal pivot offset from the fixed rotational axis of the hub a distance at least two and one-half percent of the rotor radius, control linkage to each blade to provide for cyclic blade pitch movements, said aircraft having its center of gravity longitudinally offset from the fixed rotational axis, this combination of fixed axis location with respect to the center of gravity, offset pivots and pitch control providing for a hovering flight condition in which the lift vector lies between the fixed rotational axis and the center of gravity, and the centrifugal blade moment applied through the fixed axis balances the longitudinal moment from the offset between the lift vector and the center of gravity.

3. An aircraft having a fuselage, a combined lifting and propelling rotor, a power plant having transmitting means to direct the major portion of its power to said rotor, the rotational axis structure of said rotor being in fixed relationship to said fuselage, said rotor comprising a rotor hub having a plurality of blades attached thereto on horizontal flapping pivots offset at least two and one-half percent of the blade radius from the center of rotation, each of said blades having a pitch varying pivot positioned radially outwardly from its flapping pivot, manually operable control connections to said blades to provide for cyclic pitch variation, said aircraft having its center of gravity positioned forwardly with respect to the fixed axis of rotation of said rotor.

4. An aircraft having a fuselage, a rotor which combines the functions of propelling the aircraft both vertically and horizontally, a power plant connected to said rotor to drive it for propelling purposes, said rotor having a hub portion and a plurality of rotor blades, each blade being connected to said rotor hub by a horizontal flapping pivot offset from the rotational axis of the hub a distance at least two and one-half percent of the rotor radius, each blade being further supported on a pitch pivot extending longitudinally of the blade, manual control connections to said rotor blades to provide for cyclic variation of blade pitch for control of the aircraft during flight, a mounting structure fixed to said fuselage on which said rotor hub is supported for rotational motion about a fixed axis, the fixed position of the rotational axis being located aft of the center of gravity of the aircraft, this combination providing for a hovering flight condition in which the lift vector lies between the rotational axis and the center of gravity, and the centrifugal blade moment applied through the fixed axis balances the longitudinal moment from the offset between the lift vector and the center of gravity.

JOHN E. McDONALD.

REFERENCES CITED

The following references are of record in the file of this patent:

UNITED STATES PATENTS

| Number | Name | Date |
|---|---|---|
| 1,887,703 | Vaughn | Nov. 15, 1932 |
| 1,919,089 | Breguet et al. | July 18, 1933 |
| 1,955,501 | Jette | Apr. 17, 1934 |
| 1,977,724 | Hays | Oct. 23, 1934 |
| 2,108,839 | Wilford et al. | Feb. 22, 1938 |
| 2,155,881 | Wilford et al. | Apr. 25, 1939 |
| 2,192,139 | Larsen | Feb. 27, 1940 |
| 2,225,525 | Pitcairn | Dec. 17, 1940 |
| 2,356,692 | Platt | Aug. 22, 1944 |
| 2,380,580 | Cierva | July 31, 1945 |
| 2,428,200 | Campbell | Sept. 30, 1947 |
| 2,540,473 | Campbell | Feb. 6, 1951 |
| 2,546,881 | Avery | Mar. 27, 1951 |

OTHER REFERENCES

"Aviation," issue of June 1945; pp. 123, 126, 129.